US005708655A

United States Patent [19]
Toth et al.

[11] Patent Number: 5,708,655
[45] Date of Patent: Jan. 13, 1998

[54] METHOD AND APPARATUS FOR ADDRESSING A WIRELESS COMMUNICATION STATION WITH A DYNAMICALLY-ASSIGNED ADDRESS

[75] Inventors: Stefan Toth, Göteborg; Göran Hall, Mölndal, both of Sweden

[73] Assignee: Telefonaktiebolaget L M Ericsson publ, Stockholm, Sweden

[21] Appl. No.: 664,979

[22] Filed: Jun. 14, 1996

[51] Int. Cl.[6] .................. H04B 7/00; H04Q 7/00
[52] U.S. Cl. .................. 370/313; 370/310; 370/319; 340/825.52
[58] Field of Search .................. 370/310, 313, 370/319–321, 326, 328, 329, 349, 359; 340/825.52, 825.53, 825.54

[56] References Cited

U.S. PATENT DOCUMENTS

| | | | |
|---|---|---|---|
| 4,510,493 | 4/1985 | Bux et al. | 340/825.05 |
| 4,689,786 | 8/1987 | Sidhu et al. | 370/94 |
| 5,159,592 | 10/1992 | Perkins | 370/85.7 |
| 5,166,931 | 11/1992 | Riddle | 370/94.1 |
| 5,410,543 | 4/1995 | Seitz et al. | 370/85 |

FOREIGN PATENT DOCUMENTS 0 483 547 A1  5/1992  European Pat. Off.

OTHER PUBLICATIONS

D. Cohen et al., *IP Addressing and Routing in a Local Wireless Network*, IEEE Infocom '92: Conference on Computer Communications, vol. 2, New York (US), pp. 626–632.

J. Hamalainen et al., *Proposed Operation of GSM Packet Radio Networks*, Sixth IEEE International Symposium on Personal, Indoor and Mobile Radio Communications, vol. 1, 27 Sep. 1995, New York (US), pp. 372–377.

*Primary Examiner*—Douglas W. Olms
*Assistant Examiner*—A. Bnimoussa
*Attorney, Agent, or Firm*—Jenkins & Gilchrist; Robert H. Kelly; Thomas L. Crisman

[57] ABSTRACT

A method, and associated apparatus, for providing a wireless communication station with a dynamically-assigned address which provides a temporary address to route data to the wireless communication station. A temporary address is assigned to the wireless communication station to permit data, such as packet data, to be communicated between the wireless communication station and a correspondent host. Once communication with the wireless communication station is terminated, the temporary address can be reassigned and reused pursuant to subsequent communications with another wireless communication station.

17 Claims, 6 Drawing Sheets

* THIS IS A SPECIAL CASE FOR CERTAIN APPLICATIONS

METHOD AND APPARATUS FOR ADDRESSING A WIRELESS COMMUNICATION STATION WITH A DYNAMICALLY-ASSIGNED ADDRESS

The present invention relates generally to the transmission of data, such as packet data transmitted in a communication system providing packet radio services to a wireless communication station. More particularly, the present invention relates to a method, and associated apparatus for implementing the method, for providing the wireless communication station with a dynamically-assigned address which provides a temporary address to be used to route data to the communication station.

Because a temporary address is dynamically-assigned to the communication station, routing of data to the communication station can be optimized. Such optimized routing results in lessened time delays and, therefore, increased communication thruput rates of data to the communication station. And, by providing the communication station with a dynamically-assigned address, data can be communicated to the wireless communication station even if the communication station does not have a permanent address. Problems associated with a limited supply of permanent addresses can thereby be avoided.

The present invention can be used, for example, to optimize routing of packet data to a notebook computer which is coupled by way of a radiotelephonic communication system to a packet data source. Such packet data may, for example, form "electronic mail" or "facsimile mail." Because the address of the notebook computer is dynamically-assigned, the packet data can be routed to the notebook computer in an optimal manner.

BACKGROUND OF THE INVENTION

Advancements in the fields of electronics and communications have permitted the introduction and commercialization of many new types of communication systems. Information can be affordably communicated to locations and in manners previously not possible or affordable.

The field of cellular telephony is exemplary of a communication system that has been made possible due to such advancements. Communication pursuant to a cellular telephone, or other radiotelephonic, system, is advantageous as a fixed, wireline connection is not required between a sending station and a receiving station to permit communications to be effectuated therebetween. A cellular, or other radiotelephonic, communication system is therefore particularly advantageous to effectuate communications when the use of fixed or hard-wired connections to effectuate communications would be inconvenient or impractical.

Continued advancements in the field of cellular telephony, as well as other types of radiotelephonic communications, have permitted the introduction of new services and new forms of communication pursuant to already-installed cellular, and other radiotelephonic, networks.

For instance, proposals have been set forth to provide existing cellular, and other communication networks, with the capability of communicating packet data, such as General Packet Radio Service (GPRS). Information which is to be transmitted between a sending and receiving station is formed into discrete packets of data. Individual ones of the packets can be sent on a communication channel from the sending station to the receiving station. As the information is communicated by way of discrete packets, the sending station utilizes the channel only during the time periods required to send the discrete packets. The channel is typically, therefore, a shared channel, used by a plurality of sending stations.

Because of the shared nature of such a shared channel, a packet of data to be transmitted by a sending station might have to be queued until the shared channel becomes available. However, because the shared channel is shared, the costs of transmitting data on a shared channel can be shared amongst many users as a dedicated communication channel need not be allocated to the sending station to effectuate communication of the packet. Communications effectuated via the Internet and communications pursuant to paging networks are also exemplary of communication systems which make use of data transmission of packet data.

The aforementioned, GSM digital cellular communication network is exemplary of a cellular communication system for which the introduction of GPRS has been proposed and proposed standards therefor have been promulgated. GSM mobile stations constructed corresponding to such standards are able to communicate packet data via the GSM network. A host, such as a notebook computer, can send and receive packet data once the host is suitably connected to the mobile station or, e.g., PCMCIA radio modem card. The host together with the mobile station, or analogous device, shall, at times, hereafter be referred to collectively as a wireless communication station.

In order to communicate a packet of data to a wireless communication station requires that the packet be addressed with an identification address of the wireless communication station. An Internet protocol (IP) address is exemplary of an identification address which can be used to address packets of data which are to be routed to the communication station. The IP address is, of course, utilized when transmissions are made pursuant to an Internet protocol. Analogous such addresses are used when data is to be transmitted pursuant to other protocols, such as X.25 protocol.

Many different types of services have been implemented which are effectuated by the communication of packet data.

Messaging services, for example, which permit user-to-user communication between subscribers of such services can be effectuated through the communication of packet data. Electronic mail or facsimile mail are exemplary of messaging services. Such services utilize storage units with store-and-forward mailboxing, sometimes together with messaging handling, such as information editing, processing, and conversion functions.

Certain retrieval services can also be effectuated through the communication of packet data. Such services provide the capability of accessing information stored in database centers. Information stored at such database centers is communicated to a subscriber of such services upon request by the subscriber. Retrieval services provided pursuant to the World Wide Web (WWW) of the Internet is exemplary of a retrieval service.

Tele-action services similarly can also be effectuated by the communication of packet data. Tele-action services are characterized, typically, by low data-volume (i.e., short-duration) transactions. Credit card validations, lottery transactions, utility meter readings, and electronic monitoring and surveillance system communications are all exemplary of tele-action services.

Distribution services can also be effectuated by the communication of packet data. Such services are characterized by a uni-directional flow of data from a network location to multiple numbers of other locations. News, weather, and traffic reports and product or service advertisements are exemplary of such distribution services.

Certain conversational services can also be effectuated by the communication of packet data. Conversational services provide bi-directional communication by means of real-time, end-to-end information transfer between subscribers to such services. The Internet's Telnet (TM) application is exemplary of such a service.

Certain dispatching services are similarly exemplary of bi-directional services which can be effectuated by the communication of packet data. Such services are characterized by the bi-directional flow of information from a network location (e.g., a dispatcher) and other users. Taxi and public utility fleet services are exemplary of such dispatching services.

Conferencing services are yet other types of services which can be effectuated through the communication of packet data. Such conferencing services provide multi-directional communication by means of real-time information transfer between multiple users.

While the packet data must be addressed with the identification of the wireless communication station to which the packet data is to be routed, such transmissions to a particular communication station typically occur only seldomly, and during only short intervals. For instance, the aforementioned messaging services typically utilize storage units which store the messaging information prior to communication of such information to the wireless communication station. The wireless communication station need not be reachable at a particular time for the messaging information alternately to be communicated to the wireless communication station. The message originator of the messaging information need only be cognizant of the message address, e.g., the mail-address, of the wireless communication station. Once stored at the storage unit, the wireless communication station is able thereafter, at any time, to retrieve received messages from the storage unit.

Retrieval, conversational, and tele-action services are all initiated by the wireless communication station. Because of such initiation by the wireless communication station, a service provider is required merely to be cognizant of the identification address of the wireless communication station used when requesting the service. The identification address, therefore, need not be a permanent identification which permanently identifies the wireless communication station.

Distribution services are typically broadcast over an entire broadcast area and are not directed to particular wireless communication stations. Only the area codes of the areas where the information is to be broadcast must be known to the information originator.

Dispatching and conferencing services also require merely that the identification currently being utilized by the wireless communication station be known to the service provider. That is to say, in order for the service provider to provide the dispatching or conferencing station, the service provider must be provided with the address of the communication station. The address need not, however, be a permanent address.

As indicated above, none of the aforementioned services require that the wireless communication station be identified with a permanent identification to ensure that packet data is properly addressed to be communicated to the wireless communication station. By instead assigning a temporary identification to the wireless communication station, data to be communicated to the wireless communication station can be addressed to the wireless communication station with the temporary identification. A technique by which to retrieve an IP-address when setting up a link layer connection is described in IETF RFC 1332, the PPP Internet Protocol Control Protocol. However, the use of temporary IP-addresses, dial-up IP-addresses, or other temporary identifications for identifying a host device has only been previously utilized to identify stationary hosts, such as by way of a modem. By permitting the aforementioned services to be performed in which a temporary identification, rather than an permanent identification, to address packet data to be communicated to a wireless communication station would be advantageous. Use of a temporary address would permit data to be communicated to a wireless communication station even if the wireless communication station does not have a permanent identification assigned to it. Further, by assigning a temporary identification to the wireless communication station, routing of data to the wireless communication station can be optimized. When routing of the data is optimized, communication delay times are minimized and thruput rates are maximized.

What is needed, therefore, is a manner by which to provide a wireless communication station with a dynamically-assigned address by which data to be routed to the wireless communication station can be addressed. Data which is to be communicated to the wireless communication station can then be addressed with the temporary, i.e., dynamically-assigned, address of the wireless communication station, thereby to permit the data to be communicated to the wireless communication station.

It is in light of this background information related to the communication of data that the significant improvements of the present invention have evolved.

SUMMARY OF THE INVENTION

The present invention advantageously provides a method, and associated apparatus, which provides a wireless communication station with a dynamically-assigned address by which data to be routed to the wireless communication station is addressed. Data, once addressed with the dynamically-assigned address is routed to the wireless communication station. The dynamically-assigned address provides a temporary address to permit the routing of the data to the wireless communication station.

Because a temporary address is dynamically-assigned to the wireless communication station, routing of data to the communication station can be optimized. Communication delay times are minimized and thruput rates are maximized. And, by assigning a dynamically-assigned address to the wireless communication station, communication between the wireless communication station and a selected communication station can be effectuated without requiring that the wireless communication station be provided with a permanent address. Problems associated with a limited supply of permanent addresses are avoided, as the dynamically-assigned address can instead be provided to the wireless communication station. The dynamically-assigned address forms a temporary address which can subsequently be reassigned.

In one implementation of the present invention, the wireless communication station is operable to communicate with a selected communication station by way of a communication network having a home network and a visited network. If, for example, the communication station is registered in a home network but roams to a visited network, the temporary identification can be assigned to the communication station by the visited network. The home network need not be accessed. Packet data stored or generated at the visited network can be routed to the communication station by addressing the data with the temporary identification assigned to the communication station. As packet data can be communicated between the communication network and the communication station once a temporary identification is assigned to the communication station, the packet data can be communicated between the communication network and the communication station without requiring that the communication station have a permanent identification.

The wireless communication station may, for example, be formed of a notebook computer which is coupled to a mobile radiotelephone or PCMCIA radio modem card. Data, such as packet data, stored or generated at a packet data source or storage location is routed from the packet data source or storage location to the wireless communication station by addressing the packet data with the dynamically-assigned address. Because of the dynamic assignment by which the dynamically-assigned address is assigned, the data can be routed to the notebook computer in an optimal manner. Communication delays are thereby minimized and thruput rates are maximized.

In one embodiment, circuit-switched data is routed to the wireless communication station. In another embodiment, packet data is routed to the wireless communication station. The ability to address packet data to the wireless communication station by addressing the packet data with a dynamically-assigned address facilitates the effectuation of any of many different types of services which utilize the communication of packet data. For instance, messaging services, retrieval services, tele-action services, distribution services, two-way conversational services, dispatching services, and conferencing services are all examples of services in which embodiments of the present invention can be incorporated to facilitate optimization of communication of packet data pursuant to such services.

In these and other aspects, therefore, a method and associated apparatus dynamically assigns a dynamically-assigned address to a wireless communication station, thereby to facilitate communication between a selected communication station and the wireless communication station by way of a communication network. A registration request for requesting registration of the wireless communication station is generated. The registration request requests registration of the wireless communication station to access the communication network to communicate data therethrough. The registration request includes a request for assignation to the wireless communication station with the dynamically-assigned address. The registration request is detected at the communication network. Indications of the registration request, once detected are forwarded to an address assignor. The wireless communication station is assigned with the dynamically-assigned address responsive to the indications of the registration request forwarded to the address assignor. The dynamically-assigned address is then provided to the wireless communication station.

A more complete appreciation of the present invention and the scope thereof can be obtained from the accompanying drawings which are briefly summarized below, the following detailed description of the presently-preferred embodiments of the invention, and the appended claims.

DESCRIPTION OF THE INVENTION

Figure 1:
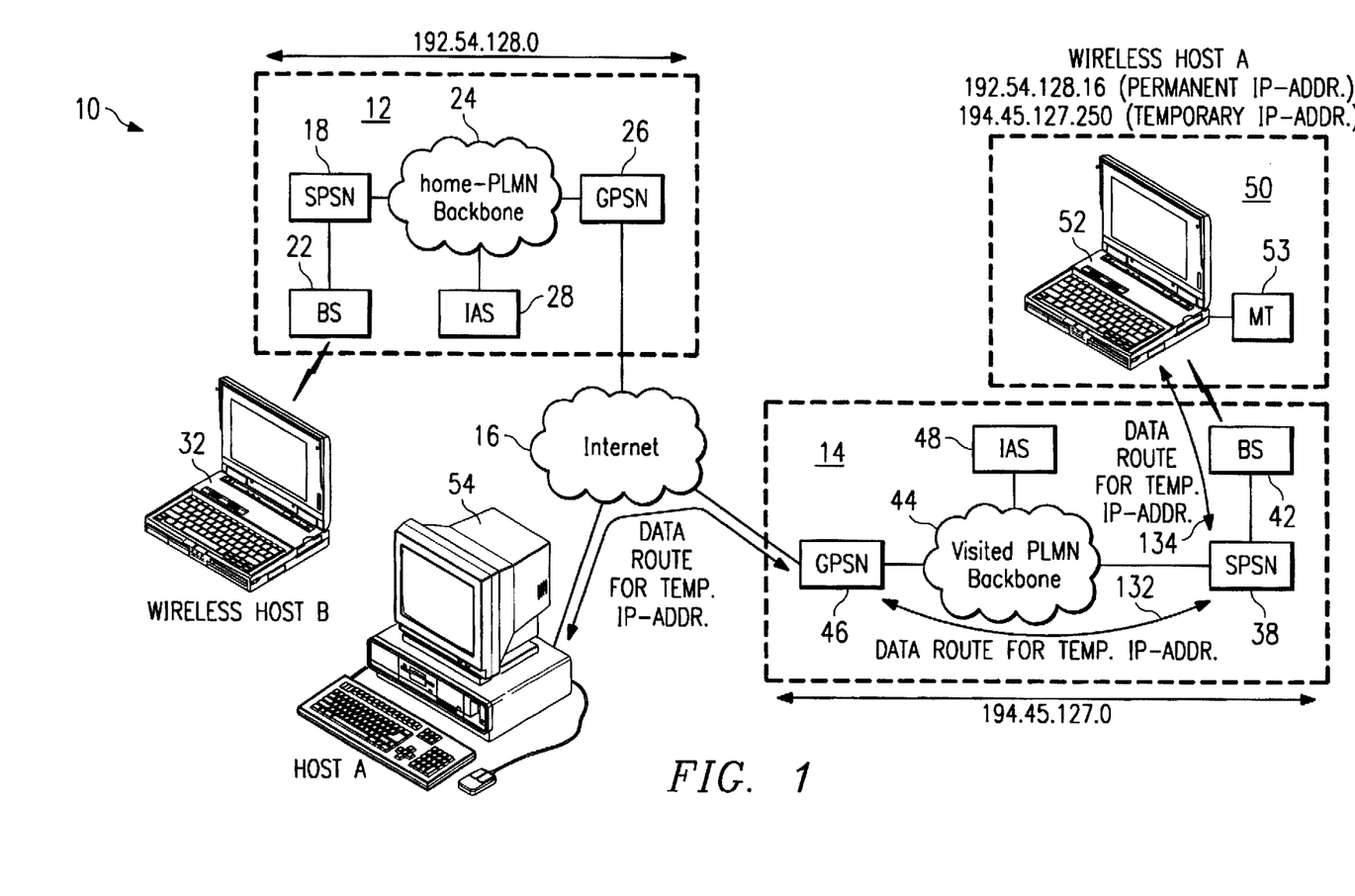
FIG. 1 illustrates a partial functional block, partial schematic diagram of a communication system in which an embodiment of the present invention is operable.

FIG. 1 illustrates a communication system, shown generally at 10, in which an embodiment of the present invention is operable. The communication system 10 is here a GPRS communication system, such as a Global System for Mobile communication (GSM) system which provides general packet radio service (GPRS). Other communication systems can be similarly represented. It should further be noted that, while the following description shall describe operation of an embodiment of the present invention in which packet data is communicated, other types of data, such as circuit-switched data can similarly be communicated in an alternate embodiment of the present invention.

The communication system 10 is here shown to include a home, public land mobile network (home-PLMN) 12 and a visited, public land mobile network (visited-PLMN) 14. The home- and visited-PLMNs are interconnected by way of an Internet 16 connection. While a single visited-PLMN is illustrated in the figure for purposes of simplicity, an actual communication system typically includes large numbers of such PLMNs, individual ones of which are connected together by way of Internet connections analogous to the Internet 16 connection illustrated in the figure.

The home-PLMN 12 includes a serving packet switch node (SPSN) 18, here coupled to a base station 22. The SPSN 18 is coupled, by way of a home-PLMN backbone 24 to a gateway packet switch node (GPSN) 26. The GPSN 26 forms a gateway to the Internet 16 and forms a connection therewith. An Internet protocol address server (IAS) 28 also forms a portion of the home-PLMN. The IAS 28 is coupled to the SPSN 18 and to the GPSN 26 by way of the home-PLMN backbone 24.

The home-PLMN 12 permits the effectuation of wireless communication with a wireless communication station, here represented by a wireless host 32. The wireless host 32 is here illustrated to be a notebook computer. The notebook computer forming the wireless host 32 communicates with the home-PLMN 12 by way of a mobile telephone or PCMCIA radio modem card, or the like (not shown in the figure).

The visited-PLMN 14 similarly includes a serving packet support node (SPSN) 38 coupled to a base station (BS) 42. The SPSN 38 is additionally connected, by way of a visited-PLMN backbone 44, to a gateway packet support node (GPSN) 46. The GPSN 46 forms a gateway to the visited-PLMN 14 and is connected to the Internet 16. The visited-PLMN 14 further includes an Internet protocol address server (IAS) 48. The IAS 48 is coupled to the SPSN 38 and to the GPSN 46 by way of the visited-PLMN backbone 44.

The base station 42 permits wireless communications to be effectuated with a wireless communication station 50, here represented by a wireless host 52. Here again, the wireless host 52 is formed of a notebook computer which is coupled to a mobile telephone 53. In another embodiment, the wireless host is instead coupled to a PCMCIA radio modem card, or the like.

The wireless host 52 is registered in the home-PLMN 12 and, when positioned in the location illustrated in the figure, is roaming in an area encompassed by the visited-PLMN 14. In the embodiment illustrated in the figure, the wireless host 52 includes an exemplary, permanent address of 192.54.128.16. As shall be described hereinbelow, during operation of an embodiment of the present invention, the wireless host 52 is further dynamically-assigned a temporary IP address, here temporary address 194.45.127.250.

A fixed host 54 is further illustrated in the figure. The fixed host 54 is connected by way of a wireline connection with the Internet 16.

During operation, communication of data, here packet data, between correspondent entities, such as the wireless host 52 and the fixed host 54, is effectuated. A temporary IP address is assigned to the wireless host 52 and packet data to be communicated to the wireless host 52 is addressed with the temporary IP address. The temporary IP address is dynamically-assigned to the wireless host. Because such address assignment is temporary, the temporary IP address can be reassigned to permit subsequent communications with another wireless host. Also the assignment of a temporary IP address to the wireless host 52 facilitates optimal routing of packets of data to the wireless host, particularly when the wireless host 52 is, as illustrated, roaming in a visited-network. Lessened delay times and quicker thruput of data is permitted as a result of such optimal routing.

Figure 2:
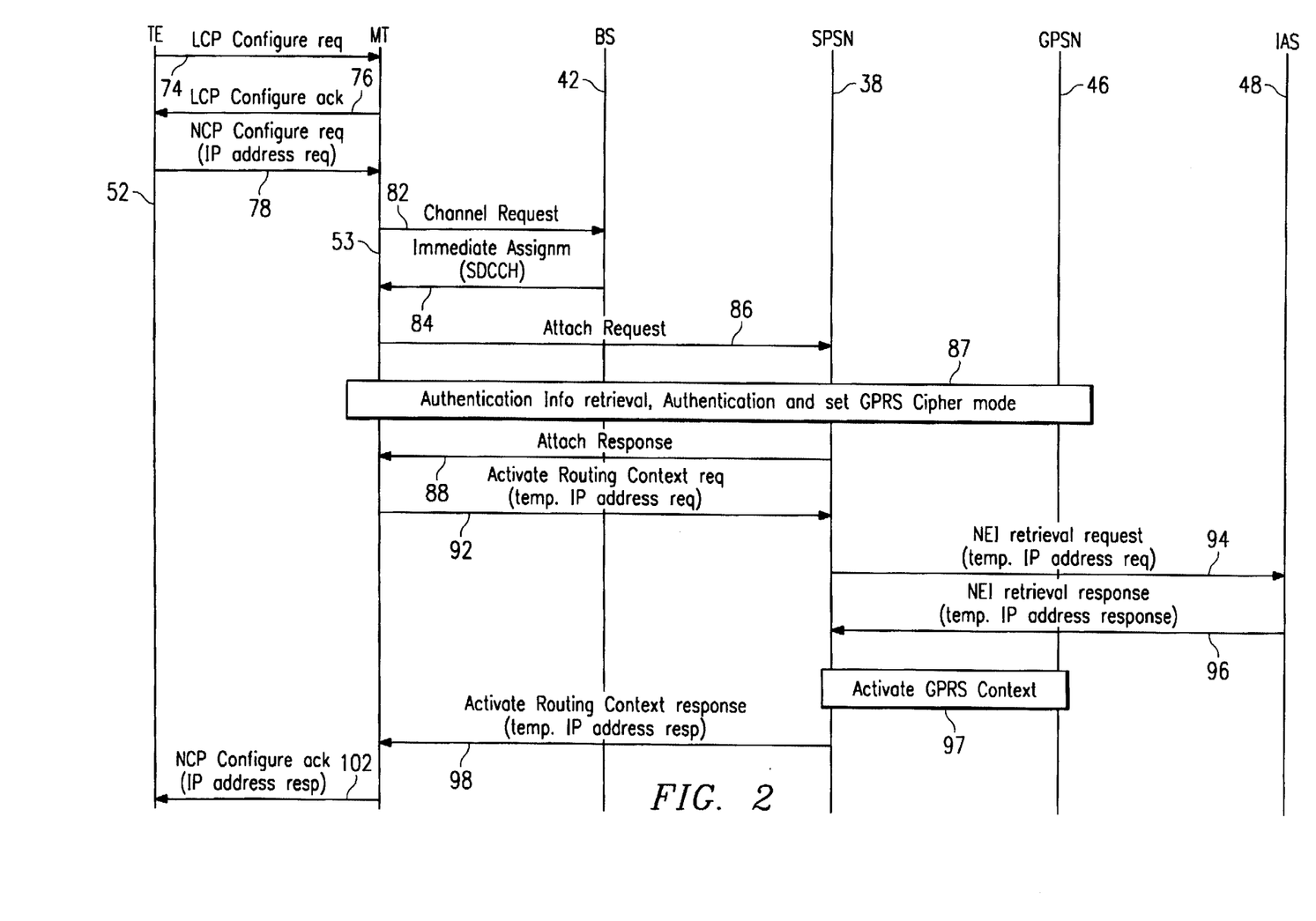
FIG. 2 illustrates a GPRS attach sequence of which an embodiment of the present invention forms a portion.

FIG. 2 illustrates an attach sequence of an embodiment of the present invention by which a temporary address is assigned to the wireless host 52 (shown in FIG. 1). By providing the wireless host with a temporary IP address, the wireless host 52 is permitted to communicate data in the communication system 10. The assignation to the wireless host 52 of the temporary IP address is provided by the IAS 28 or 48.

The wireless host 52 identifies itself with a mobile station identifier (MSI) pursuant to a registration request to an SPSN, such as the SPSN 38. In the exemplary embodiment, the registration request further indicates whether the wireless host 52 requests a temporary IP address and from which IAS, i.e., IAS 28 or IAS 48, the IP address is to be assigned.

The point-to-point (PPP) protocol which is utilized, or the IPCP protocol that is included as a network control protocol (NCP) of the PPP protocol, provides the option of a negotiation of the IP address to be used for a wireless host. A description of such option is provided in document IETF RFC 1332, the PPP Internet protocol control protocol. Such a procedure is typically performed over a point-to-point connection. However, in a wireless packet radio system, the PPP protocol is used between the wireless host and a radio transceiver device. The radio transceiver device does not assign an IP address to the host. By mapping the request for an IP address to a registration request, the registration request is forwarded to an SPSN, such as the SPSN 38. The SPSN 38 thereafter forwards the request for an IP address to an appropriate IAS, such as the IAS 48.

A context for the wireless host 52 is set up in the SPSN 38. The GPSN 46 handling the address domain for the temporary IP addresses is either informed of the temporary IP address or can retrieve the temporary address from a location register, depending upon the system in which service is implemented.

In the SPSN 38, mobile-originated, end-user data packets are encapsulated in IP packets to be tunneled to an appropriate GPSN 46 and, from there, forwarded to fixed hosts in external networks such as the fixed host 54, or to another GPSN, such as the GPSN 26, thereafter to locate another wireless host, such as the host 32. When data is to be terminated at the wireless host 52, end-user packets of data are encapsulated in the GPSN, such as the GPSN 46, handling the temporary IP addresses and are thereafter tunneled through the backbone 44 to the SPSN, here SPSN 38, currently serving the wireless host 52.

Conventional location updating procedures can be performed, and the same temporary IP address is assigned to the wireless host 52 as long as the wireless host 52 is registered, or roamed, to the same PLMN, here PLMN 14.

The attach sequence illustrated in FIG. 2 is that of an exemplary GPRS attach sequence for a wireless host to which a temporary IP address is to be assigned. As mentioned previously, the assignation of the temporary IP address is dynamic in nature, and the temporary IP address can be reassigned subsequent to deactivation of the communications with a particular, wireless host.

First, and as indicated by the first and second sequence steps 74 and 76, respectively, a PPP link is established between the wireless host 52 and the radio transceiver, here a mobile telephone (MT) 53 positioned therewith. The PPP link is established responsive to a link control protocol (LCP) configure request forming the first sequence step 74 and an LCP configure acknowledgment forming the second sequence step 76. Other types of protocols can, of course, be utilized to perform these sequence steps and the sequence steps which shall be described below.

Once the PPP link has been established, the host 52 configures the link for use of a specific network protocol, here an Internet protocol (IP). If the host 52 does not have a permanent IP address assigned thereto or assignation of a temporary IP address is desired, such as for purposes of route optimization, a request for a temporary IP address is further provided to the mobile telephone, here indicated by the third sequence step 78 and formed of an NCP configure request.

The mobile station 53 generates signals, in conventional manner, to request a channel allocation from the base station 42, as indicated by the sequence step 82, and the base station 42 responds with an immediate assignment, such as that on a slow data control channel (SDCCH), as indicated by the sequence step 84. If the radio transceiver is not registered, an attach request, indicated by the sequence step 86, is generated and transmitted to the SPSN 38. Conventional authentication procedures, indicated by block 87, are thereafter implemented in, for example, GPRS cipher mode, and an attach response is generated by the SPSN 38 and provided to the radio transceiver, here indicated by the sequence step 88. If the radio transceiver is already attached to the PLMN, the attach procedure does not need to be repeated.

Once the attach procedure is completed, the radio transceiver sends an activate routing context request to the SPSN 38. The activate routing context request is indicated in the figure by the sequence step 92. The activate routing context request includes a request for a temporary IP address. Such a request is forwarded from the NCP configure request forming the sequence step 78.

An NEI retrieval request is sent by the SPSN 38 to an appropriate Internet protocol address server, here the server 48. The selection of the IAS from which the temporary IP address is to be assigned is selected by the wireless host 52. Instead of the IAS 48, another IAS, such as the IAS 28 can be selected.

Responsive to the request indicated by the sequence step 94, an NEI retrieval response is generated by the IAS, as indicated by the sequence step 96. The NEI retrieval response includes the temporary IP address assigned to the host 52 by the IAS 48. The NEI retrieval response forming the sequence step 96 also includes information related to the GPSN that is to handle the assigned IP address, and after a context has been set up with such GPSN, here the GPSN 46, and a GPRS context has been activated, indicated by block 97, an activate routing context response is forwarded on to the radio transceiver by the SPSN 38. The activate routing context response is indicated in the figure by the sequence step 98.

Once the activate routing context response, which includes the temporary IP address assigned by the IAS 48, is received at the radio transceiver, the assigned IP address is forwarded to the host 52 as part of an NCP configure acknowledgment, indicated in the figure by the sequence step 102.

When the activate routing context response is received by the radio transceiver, a context is also established in the radio transceiver with the SPSN 38 and a logical link between the radio transceiver and the SPSN is established. The host 52 is then able to send IP data packets to the radio transceiver, thereafter to be forwarded to a correspondent host.

Figure 3:
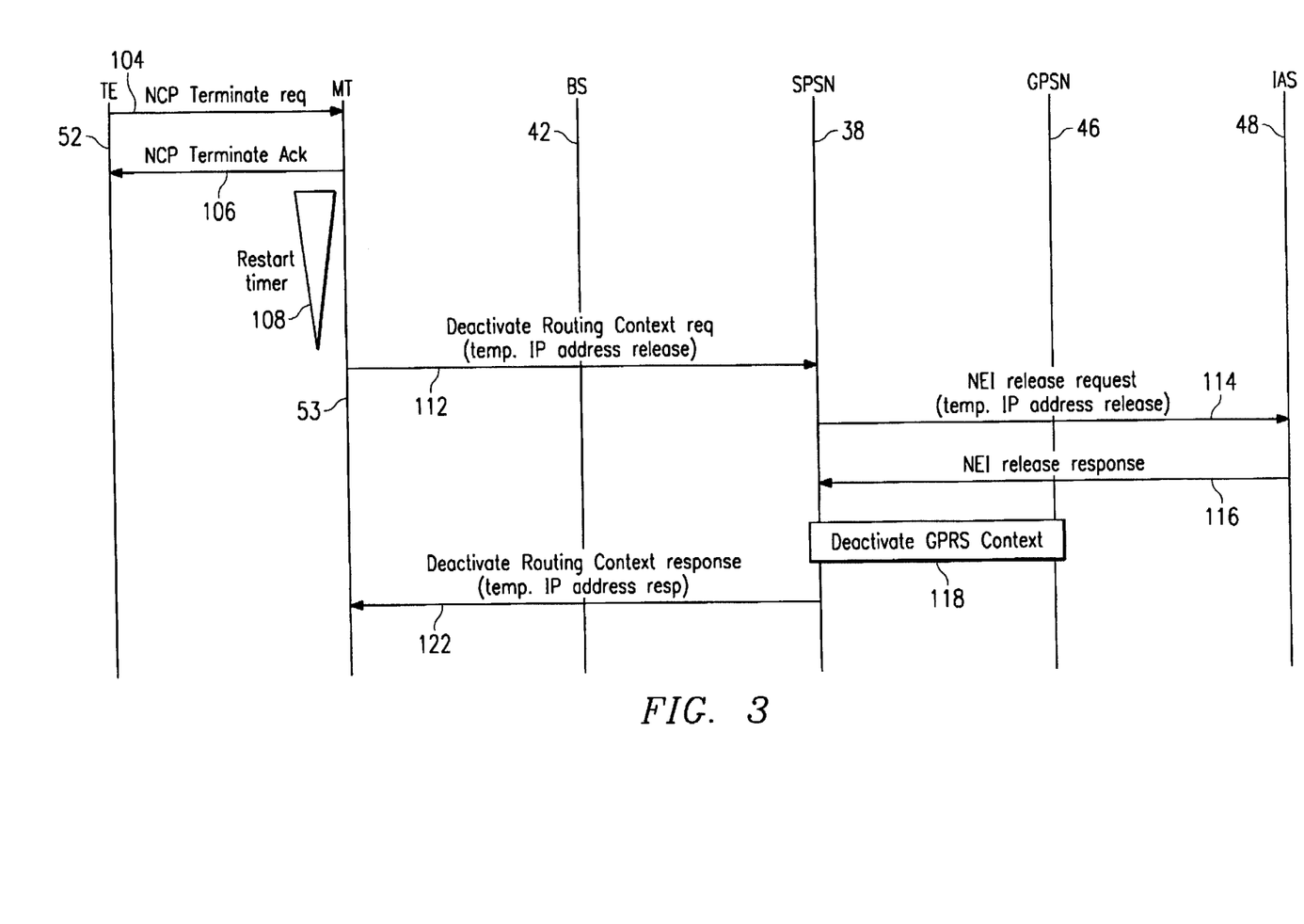
FIG. 3 illustrates a GPRS deactivation context routing sequence of an embodiment of the present invention.

At the completion of communications or when otherwise desired, the wireless host 52 initiates the removal of the established link layer. An exemplary GPRS deactivation context routing sequence is illustrated in FIG. 3. The host 52 initiates the deactivation by sending a termination request in PPP or, rather, via LCP of PPP.

When the host 52 terminates the network layer communication by way of a termination request in IPCP of PPP or when an inactivity timer of PPP times out, the temporary IP address assigned to the wireless host is returned to a pool of unused IP addresses in the IAS 46. However, packets of data in the network may not yet have reached the wireless host 52. To prevent the routing of such data to another wireless host when the temporary IP address is reused, once returned to the pool of unused IP addresses, such IP address should not be reused for at least a selected time period. Thereafter, the IP address is again available to be reused.

As illustrated in FIG. 3, an NCP terminate request is generated by the wireless host 52 and provided to the radio transceiver. The NCP terminate request is indicated in the figure by the sequence step 104. The NCP (IPCP) terminate request is generated over the PPP link to the radio transceiver as indicated by the sequence step 104. The radio transceiver responds with an NCP (IPCP) terminate acknowledgment indicated by sequence step 106 in the figure.

Thereafter, the radio transceiver waits for a time period at least as great as one restart time. Such time period is indicated in the figure by arrow 108. Thereafter, the radio transceiver sends a deactivate routing context request to the SPSN 38. The deactivate routing context request is indicated in the figure by the sequence step 112. The deactivate routing context request includes an indication that the temporary IP address can be released.

The request to release the IP address is mapped in the SPSN 38 to an NEI release request that is sent to the IAS 48. Such NEI release request is indicated in the figure by the sequence step 114. Once received at the IAS 48, the IAS sends an NEI release response to the SPSN. Such response is indicated in the figure by the sequence step 116. The SPSN, responsive thereto, starts a context deactivation procedure towards the GPSN 46. Such context deactivation procedure is indicated by the block 118 in the figure. Then, and as indicated by the sequence step 122, a deactivate routing context response is sent from the SPSN 38 to the radio transceiver and the deactivate routing context sequence is ended.

Referring again to FIG. 1, routing of packet data to the wireless host 52 when the host is roaming and the visited-PLMN 14 is optimized as a temporary IP address can be assigned to the wireless host 52 by the IAS 48 of the visited-PLMN instead of the IAS 28 of the home-PLMN 12. As described with respect to FIG. 2, during registration of the wireless host, a request is made for a temporary IP address.

By selecting the IAS 48 to assign the temporary address to the wireless host 52, the registration request need not be routed back to the home-PLMN 12. Once the wireless host is assigned with the temporary IP address, the assigned address is provided by the wireless host 52 to a correspondent host, such as the fixed host 54. Communication of packet data pursuant to a particular service is thereafter effectuated. The data route for packet data addressed with the temporary IP address of the wireless host is indicated by the arrows 128, 132, and 134 in the figure.

Because the temporary address is assigned to the wireless host by the visited IAS 48 of the visited-PLMN rather than the home-PLMN, routing of data to the wireless host 52 is optimized, thereby minimizing communication delay times and maximizing communication thruput rates. And, because the temporary IP address can be reassigned, problems associated with the limited supply of permanent addresses assignable to wireless hosts are obviated.

FIG. 4 again illustrates the communication system 10 having elements corresponding to those shown in the illustration of FIG. 1. Such elements are identified with the same reference numerals as those used to identify corresponding elements illustrated in FIG. 1. As the connection and operation of such elements are identical to those as described with respect to FIG. 1, the foregoing description shall not be repeated.

Figure 4:
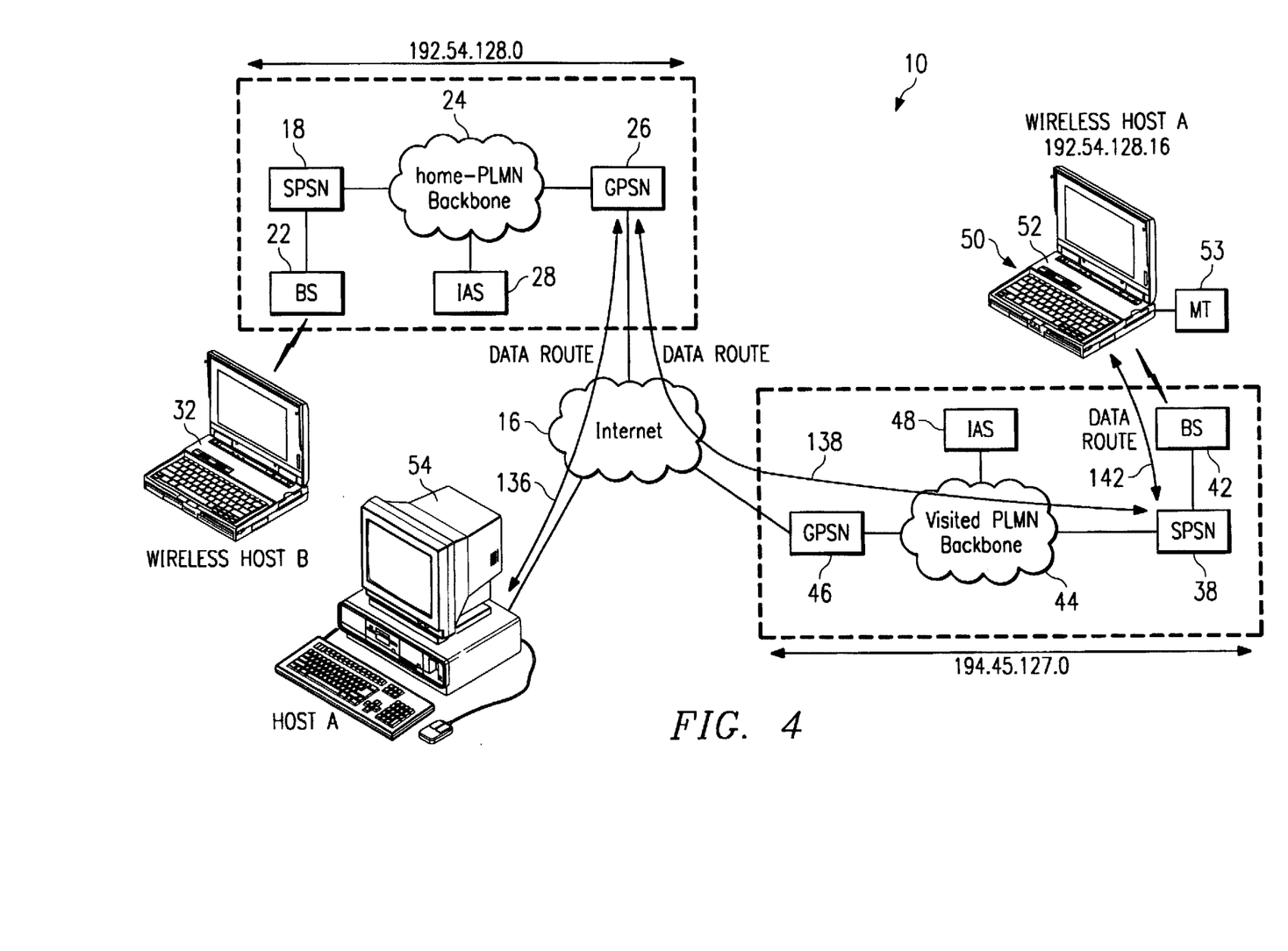
FIG. 4 illustrates a partial functional block, partial schematic diagram, similar to that shown in FIG. 1, but illustrating another manner of operation of an embodiment of the present invention.

The illustration of FIG. 4 illustrates a data route of packet data when a permanent address assigned to the wireless host 52 is used to address packet data to the wireless host. When the permanent address is utilized, both mobile-originated and mobile-terminated data must be routed by way of the GPSN 26 of the home-PLMN 12. The data communicated between the wireless host 52 and a correspondent host, here the fixed host 54, is indicated by the segments 136, 138, and 142.

Comparison of the data routes required to be taken by the packet data in the exemplary illustration of FIG. 4 with the illustration of FIG. 1 illustrates pictorially the advantages permitted through operation of an embodiment of the present invention. As the data route shown in FIG. 1 does not require that the data be routed between the fixed host 54 and the wireless host 52 by way of the GPSN 26, communication delay times are minimized and communication thruput rates are maximized.

Figure 5:
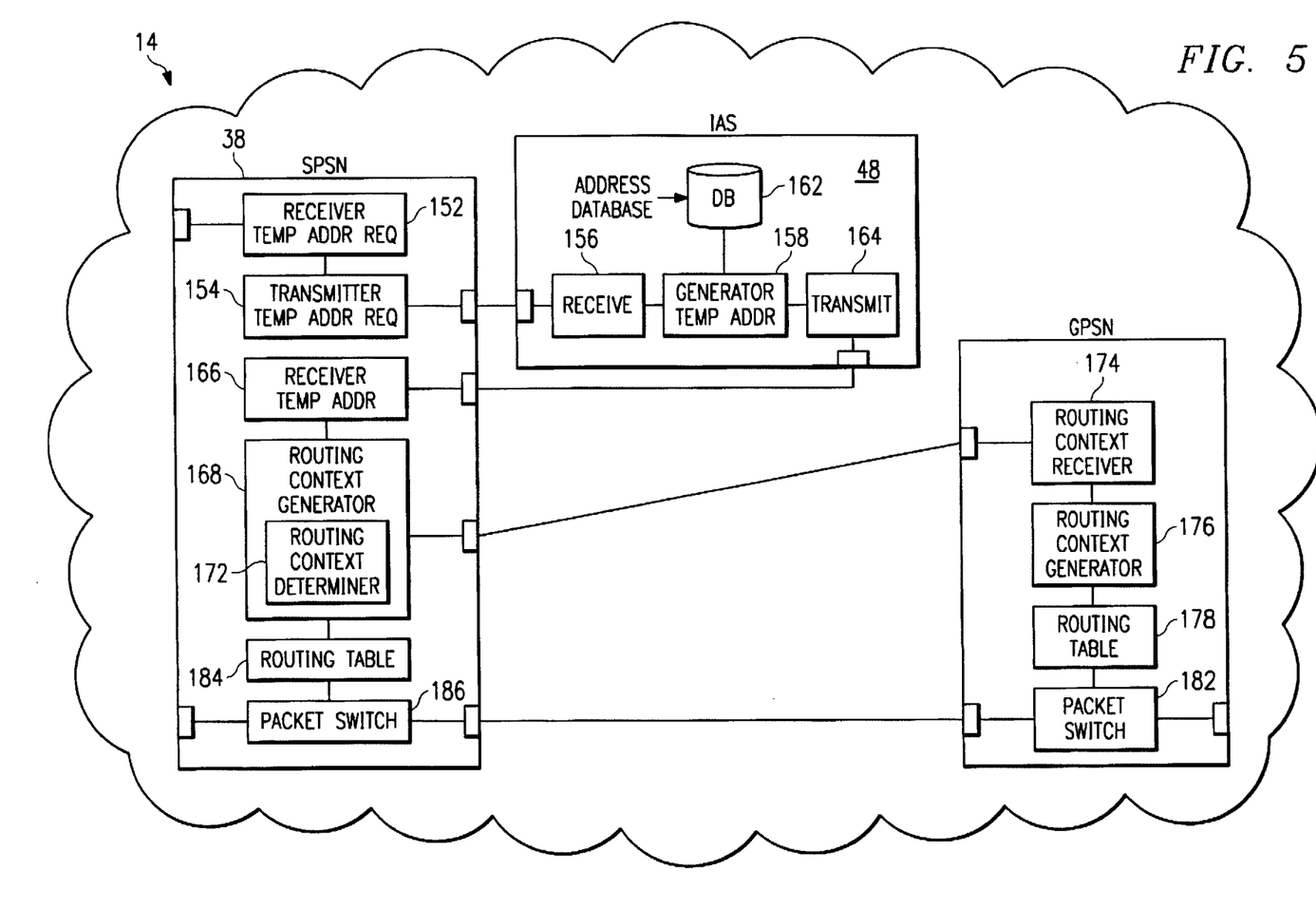
FIG. 5 illustrates a functional block diagram of a portion of a public land mobile network which includes an embodiment of the present invention.

FIG. 5 illustrates portions of the visited-PLMN 14 in greater detail. The visited-PLMN 14 is again shown to include the SPSN 38, the GPSN 46, and the IAS 48. As indicated previously, the SPSN 48 and the GPSN 46 form a portion of the visited-PLMN backbone 44, but are separately shown for purposes of illustration.

The SPSN 38 includes a receiver 152 for receiving the temporary address request generated by the wireless host 52.

Once the temporary address request is received, the request is forwarded to a transmitter 154 which forwards the request to a receiver 156 of the IAS 48. The request received by the receiver 156 is provided to a temporary address generator 158 which retrieves an available temporary IP address from a database 162.

The retrieved, temporary IP address is provided to a transmitter 164 which forwards the temporary IP address to a receiver 166 of the SPSN 38. The received temporary address is provided to a routing context generator 168 which includes a routing context determiner 172 as a portion thereof. Indications of the routing context determined by the determiner 172 of the generator 168 are provided to a routing context receiver 174 of the GPSN 46.

Signals representative of such indications are provided to a routing context generator 176 which updates routing tables, here represented by a routing table 178 associated with packet switches, here represented by a packet switch 182.

Similarly, the routing context generator 168 causes routing tables, here represented by a routing table 184, to be updated. The routing tables are associated with the packet switches here represented by a packet switch 186. Thereby, a routing context is created in the visited-PLMN to permit the communication of packets of data between the wireless host 52 and a correspondent host such as the host 54.

Figure 6:
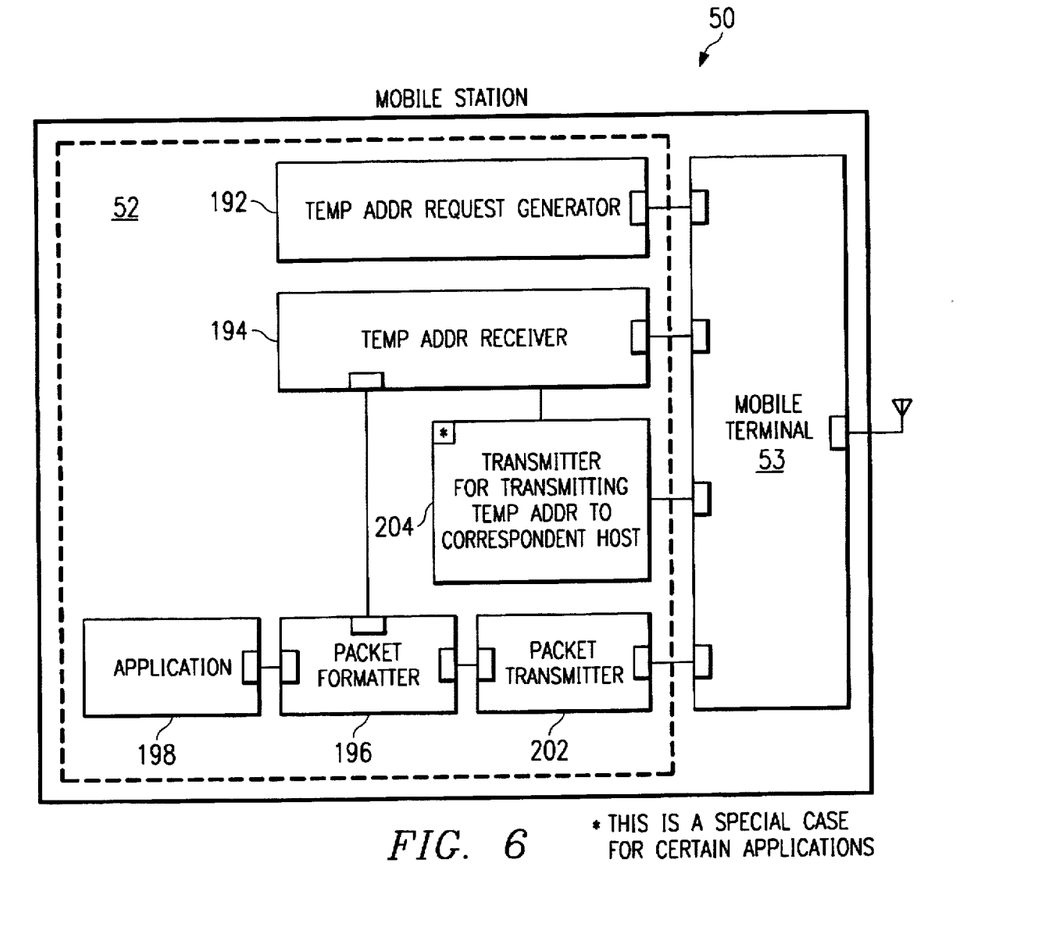
FIG. 6 illustrates a functional block diagram of a wireless communication station which includes an embodiment of the present invention.

FIG. 6 illustrates the wireless communication station 50, here formed of the wireless host 52 and a mobile terminal 53. The wireless host is here shown to include a temporary address request generator 192 which generates a temporary address request, as described previously. The temporary address request is provided to the mobile terminal 53 which transmits the request therefrom.

Once a temporary IP address has been assigned to the wireless host 52, the temporary IP address is transmitted to the wireless communication station 50 and received at the mobile terminal 53. The received, temporary IP address is provided to a temporary address receiver 194 of the wireless communication station. The temporary IP address received by the receiver 194 is provided to a packet data formatter 196. The packet data formatter 196 is operative pursuant to a particular application or service, here represented functionally by the application block 198. Packet data to be generated by the wireless host 52 is provided to a packet data transmitter 202 which provides such packet data to the mobile terminal 53 to be transmitted therefrom.

The wireless communication station 50 is further shown to include an additional transmitter 204 operable directly to transmit temporary addresses to a correspondent host by way of the mobile terminal 53.

Operation of the embodiment of the present invention, as above described, provides a wireless communication station with a dynamically-assigned address by which data to be routed to the communication station is addressed. Once addressed with the dynamically-assigned address, data, such as packet data, is routed to the wireless communication station. Because of the temporary and dynamic assignment of the address, routing of data to the communication station can be optimized. Communication delay times are minimized and thruput rates are maximized. Also, because a permanent address is not required to be provided to the wireless communication station, problems associated with a limited supply of permanent addresses is obviated.

The previous descriptions are of preferred examples for implementing the invention, and the scope of the invention should not necessarily be limited by this description. The scope of the present invention is defined by the following claims.

What is claimed is:

1. In a method for communicating data between a selected communication station and a wireless communication station by way of a communication network, which network includes a base station for radio communication with said wireless communication station, a serving switching node for data communication with said base station, a gateway switching node for connecting said serving switching node to said network and a plurality of address servers connected for data communication with both said gateway and serving switching nodes, an improvement of a method for dynamically assigning a network address to the wireless communication station, said method comprising the steps of:

generating a registration request for requesting registration of the wireless communication station to access the communication network to communicate the data therethrough, the registration request including a request for assignment of a dynamically-assigned address to the wireless communication station by a specified one of said plurality of address servers;

detecting at the serving switching node the registration request generated during said step of generating;

forwarding indications of the registration request detected during said step of detecting to said specified address server;

assigning to the wireless communication station within said specified address server a dynamically-assigned address responsive to the indications of the registration request forwarded to said specified address server during said step of forwarding; and associating within said address server the network identity of said gateway switching node which is to handle data messages to and from said dynamically-assigned address;

returning said dynamically-assigned address and the associated network identification of the gateway serving node from said specified address server to said serving switching node;

providing said dynamically-assigned address from said serving switching node to the wireless communication station.

2. The method of claim 1 comprising the further step of communicating the data between the selected communication station and the wireless communication station.

3. The method of claim 2 wherein the data communicated during said step of communicating comprises data communicated from the selected communication station to the wireless communication station, said step of communicating further comprising the step of addressing the data with the dynamically-assigned address provided during said step of providing to the wireless communication station.

4. The method of claim 1 wherein the registration request generated during said step of generating is generated by the wireless communication station.

5. The method of claim 1 wherein the registration request generated during said step of generating further comprises a permanent identifier which permanently identifies the wireless communication station.

6. The method of claim 1 wherein the communication network is formed of a radiotelephonic communication network of a radiotelephonic communication system which provides general packet radio services, and wherein the registration request detected during said step of detecting is detected by both said base station and said serving switching node.

7. The method of claim 6 wherein the radiotelephonic communication network comprises a home public land mobile network and a visited public land mobile network and wherein the specified address server to which the indications of the registration request are forwarded during said step of forwarding forms a portion of the visited public land mobile network.

8. The method of claim 6 wherein the communication network comprises a home public land mobile network and a visited public land mobile network and wherein the specified address server to which the indications of the registration request are forwarded during said step of forwarding forms a portion of the home public land mobile network.

9. The method of claim 7 wherein said plurality of address servers within said network comprise at least a first address server located within said home public land mobile network and a second address server located within said visited public land mobile network and wherein said step of forwarding comprises forwarding the indications of the registration request to a selected one of the at least first and second address servers, respectively.

10. The method of claim 6 wherein the radiotelephonic communication system which provides general packet radio service comprises a Global System for Mobile communication, radiotelephonic communication system which provides general packet radio service, wherein packet radio service is provided to the wireless communication station responsive to an attach procedure, and wherein at least a portion of the registration request generated during said step of registering is generated subsequent to the attach procedure.

11. The method of claim 10 wherein the portion of the registration request generated subsequent to the attach procedure comprises an activate routing context request, the activate routing context request for requesting assignment to the wireless communication station of the dynamically-assigned address.

12. The method of claim 11 wherein the activate routing context request further comprises a request for assignment of the dynamically-assigned address by a selected address server.

13. In a communication system having a selected communication station, a wireless communication station and a communication network which includes a base station for radio communication with said wireless communication station, a serving switching node for data communication with said base station, a gateway switching node for connecting said serving switching node to said network and a plurality of address servers connected for data communication with both said gateway and serving switching nodes, an improvement of apparatus for dynamically assigning to the wireless communication station with a network address, said apparatus comprising:

a registration request generator positioned at the wireless communication station, said registration request generator for generating a registration request to request registration of the wireless communication station to access the communication network to communicate packet data therethrough, the registration request including a request for assignment to the wireless communication station of the dynamically-assigned address by a specified one of said plurality of address servers;

a detector located at the serving switching node and coupled to the communication network, said detector for detecting the registration request generated by said registration request generator;

an address assignor located within said selected address server and operative in response to a message from said serving switching node following detection by said detector of the registration request, said address assignor for assigning to the wireless communication station the dynamically-assigned address; means for associating within said selected address server the network identity of the gateway switching node which is to handle data messages to and from said dynamically-assigned address;

means for returning said dynamically-assigned address and the associated network identification of the gateway serving node from the specified address server to said serving switching node; and a transmitter coupled to receive indications of the dynamically-assigned address assigned by said address assignor, said transmitter for transmitting the indications of the dynamically-assigned address to the wireless communication station.

14. In a communication system having a wireless communication station, a selected communication station, and a communication network which includes a base station for radio communication with said wireless communication station, a serving switching node for data communication with said base station, a gateway switching node for connecting said serving switching node to said network and a plurality of address servers connected for data communication with both said gateway and serving switching nodes, an improvement of apparatus for the communication network for dynamically assigning the wireless communication station with a dynamically-assigned address, said apparatus comprising:

a detector located at the serving switching node for detecting a registration request generated by the wireless communication station, the registration-request including a request for assignment to the wireless communication station of a dynamically-assigned address;

an address assignor located within said selected address server and operative in response to a message from said serving switching node following detection by said detector of the registration request, said address assignor for assigning to the wireless communication station a dynamically-assigned address;

means for associating within said selected address server the network identity of the gateway switching node which is to handle data messages to and from said dynamically-assigned address;

means for returning said dynamically-assigned address and the associated network identification of the gateway serving node from the specific address server to said serving switching node; and a transmitter coupled to receive indications of the dynamically-assigned address assigned by said address assignor, said transmitter for transmitting the indications of the dynamically-assigned address to the wireless communication station.

15. In a data communication system having a wireless communication station and a communication network which includes a base station for radio communication with said wireless communication station, a serving switching node for data communication with said base station, a gateway switching node for connecting said serving switching node to said network and a plurality of address servers connected for data communication with both said gateway and serving switching nodes, an improvement of apparatus for the wireless communication station for providing the wireless communication station with a dynamically-assigned address, said apparatus comprising:

a registration request generator positioned at the wireless communication station, said registration request generator for generating a registration request to request registration of the wireless communication station to access the communication network to communicate packet data therethrough, the registration request including a request for assignment to the wireless communication station of a dynamically-assigned address by a specified one of said plurality of address servers; and a receiver for receiving indications of the dynamically-assigned address selected at the communication network by said specified one of said plurality of address servers and transmitted to the wireless communication station.

16. An attach sequence for attaching a wireless communication station formed of a host coupled to a radio transceiver to a public land mobile network, said attach sequence comprising:

establishing a link between the host and the radio transceiver;

performing an attach procedure between the radio transceiver and a serving packet service node of the public land mobile network;

sending an activate routing context request to the serving packet service node;

forwarding a temporary address request to an address server;

assigning a temporary address to the host;

providing the temporary address to the serving packet switch node;

sending an activate routing context response to the radio transceiver, the activate routing context response including an indication of the temporary address; and providing the temporary address to the host.

17. A deactivation context sequence for deactivating assignment of a temporary address to a wireless communication station formed of a host and a radio transceiver, the temporary address assigned to the wireless communication station by an address server of a public land mobile network, the sequence comprising the steps of:

generating a terminate request upon a link formed between the host and the radio transceiver;

sending a deactivate context request to a serving packet switch node of the public land mobile network;

forwarding a temporary address release request from the serving packet switch node to the address server;

de-assigning the temporary address from the host;

returning a release response to the serving packet switch node; and forwarding a deactivate routing context response to the radio transceiver.

* * * * *

UNITED STATES PATENT AND TRADEMARK OFFICE
CERTIFICATE OF CORRECTION

PATENT NO.   : 5,708,655
DATED        : January 13, 1998
INVENTOR(S)  : Toth et al.

It is certified that error appears in the above-identified patent and that said Letters Patent is hereby corrected as shown below:

Column 14, line 49        Replace "specific"
                          With --specified--

Signed and Sealed this

Twenty-fourth Day of April, 2001

Attest:

NICHOLAS P. GODICI

Attesting Officer        Acting Director of the United States Patent and Trademark Office